(12) United States Patent
Lin

(10) Patent No.: US 8,282,057 B2
(45) Date of Patent: Oct. 9, 2012

(54) SUCKER ATTACHMENT DEVICE HAVING DIRECTION ADJUSTABLE FUNCTION

(76) Inventor: Hung-Wei Lin, Taichung (TW)

( * ) Notice: Subject to any disclaimer, the term of this patent is extended or adjusted under 35 U.S.C. 154(b) by 166 days.

(21) Appl. No.: 12/799,492

(22) Filed: Apr. 27, 2010

(65) Prior Publication Data

US 2011/0260022 A1    Oct. 27, 2011

(51) Int. Cl.
*A45D 42/14* (2006.01)
(52) U.S. Cl. ............. 248/205.5; 248/183.1; 248/221.11
(58) Field of Classification Search ............... 248/183.1, 248/183.2, 221.11, 186.2, 187.1, 415, 920, 248/923, 176.3, 284.1, 291.1, 292.12, 150, 248/165, 166, 222.13
See application file for complete search history.

(56) References Cited

U.S. PATENT DOCUMENTS

| | | | | |
|---|---|---|---|---|
| 6,663,064 B1 * | 12/2003 | Minelli et al. | ............ | 248/205.5 |
| 7,380,759 B1 * | 6/2008 | Whiteside et al. | ......... | 248/183.1 |
| 7,735,791 B2 * | 6/2010 | Bury | .......................... | 248/205.5 |
| 7,857,268 B2 * | 12/2010 | Chiu | .......................... | 248/206.3 |
| 2009/0108152 A1 * | 4/2009 | Carnevali | .................. | 248/205.5 |
| 2010/0282928 A1 * | 11/2010 | Hsu et al. | ................... | 248/205.4 |

* cited by examiner

*Primary Examiner* — Terrell McKinnon
*Assistant Examiner* — Monica Millner
(74) *Attorney, Agent, or Firm* — Alan Kamrath; Kamrath IP Lawfirm, PA

(57) ABSTRACT

A sucker attachment device includes a support base, a pivot seat pivotally mounted on the support base, a sucker mounted on the pivot seat, a rotation disk swivelably mounted on the support base, and a receptacle assembly mounted on the rotation disk. The pivot seat has a spherical universal connector pivotally mounted on the support base. The support base has an end portion formed with a spherical pivot recess, and the universal connector is rotatably mounted in the pivot recess of the support base. Thus, when the support base is pivoted relative to the universal connector, the universal connector is rotated in the pivot recess through 360° so that the support base is pivoted relative to the pivot seat to change the angle and direction between the sucker and the receptacle assembly freely.

19 Claims, 14 Drawing Sheets

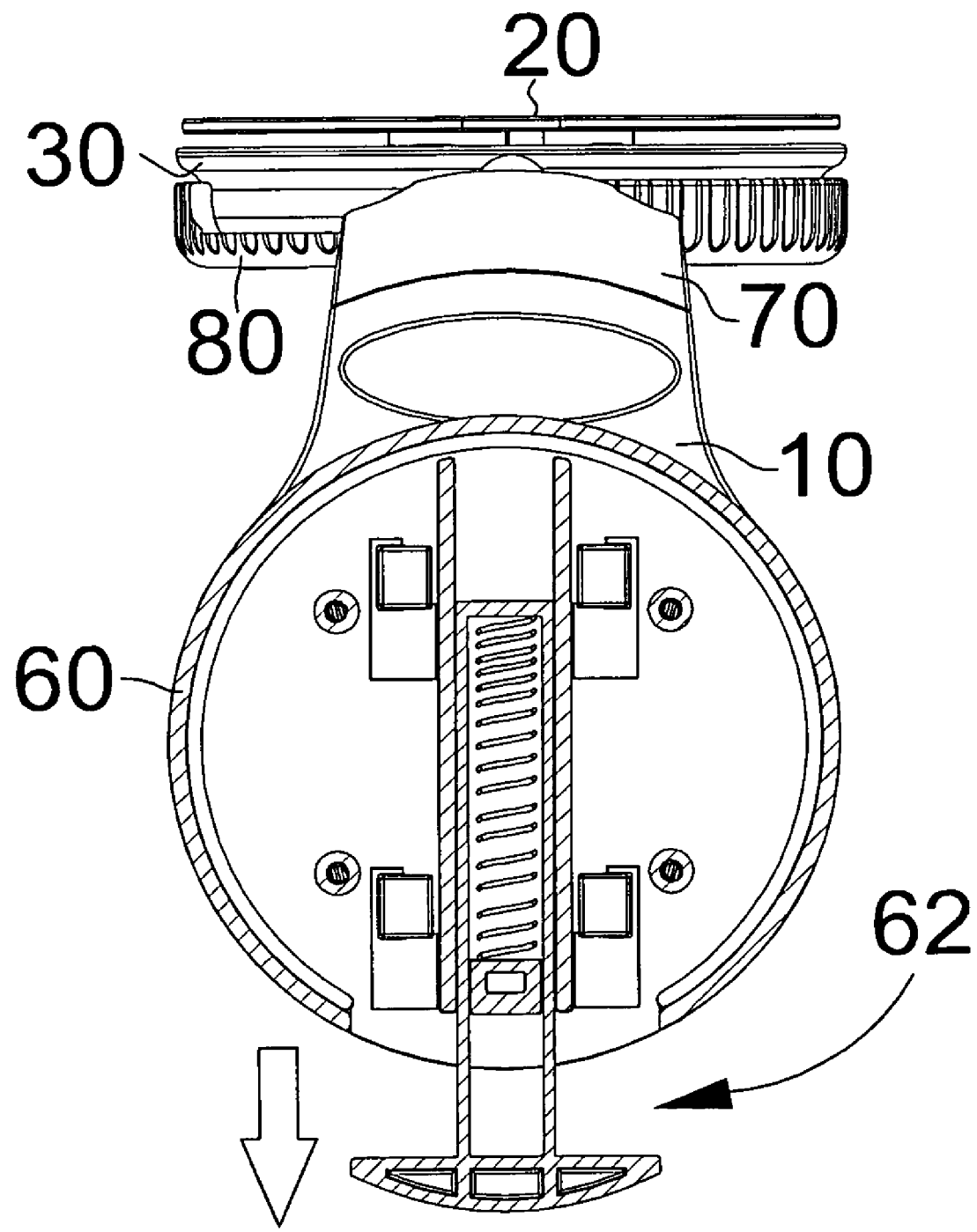
F I G. 11

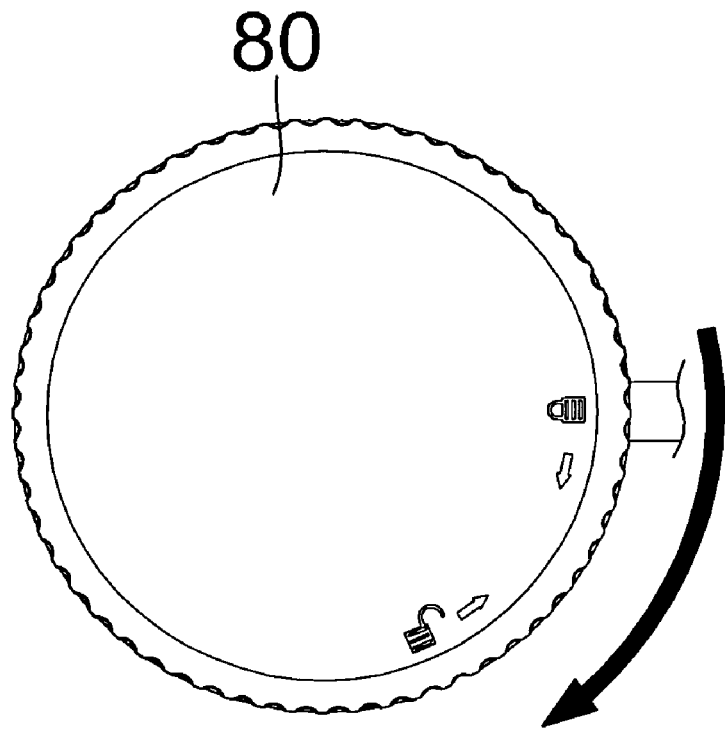
F I G. 13
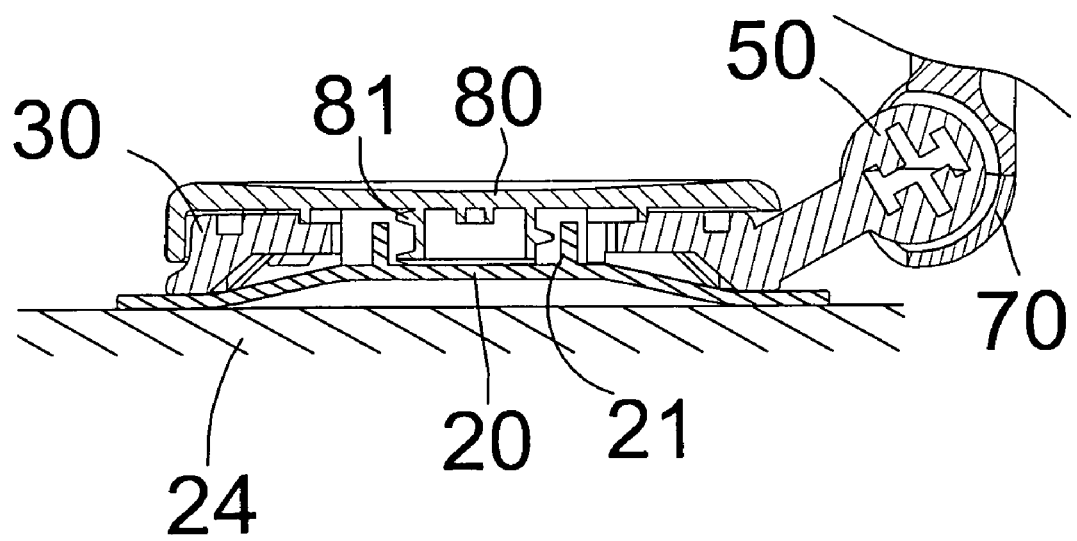
F I G. 12

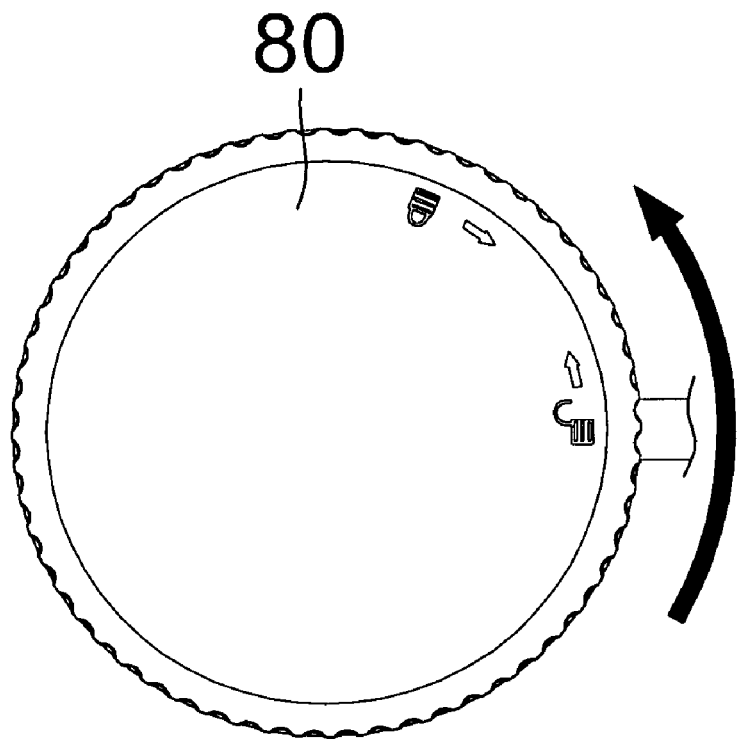
F I G. 15
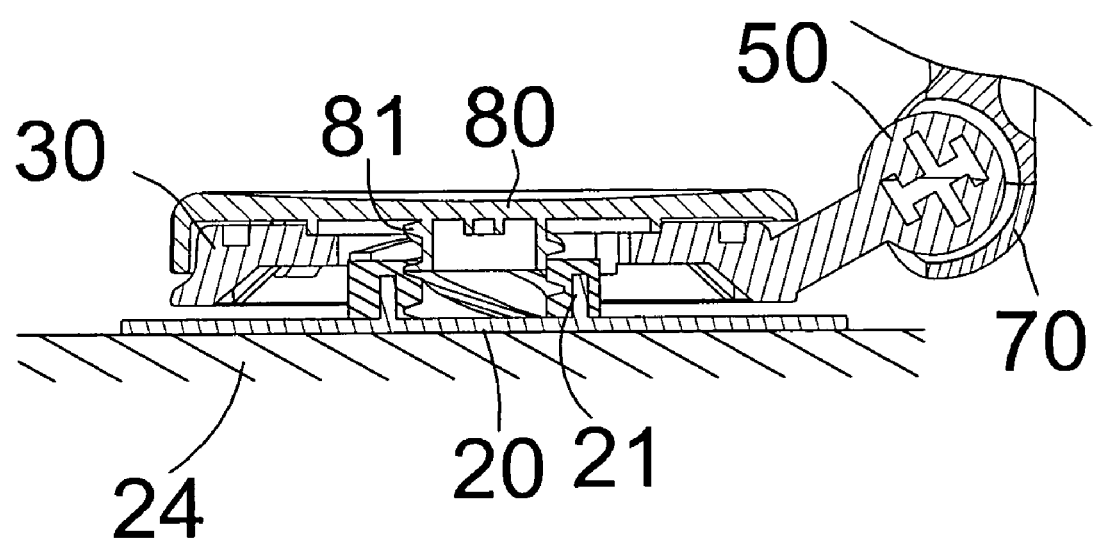
F I G. 14

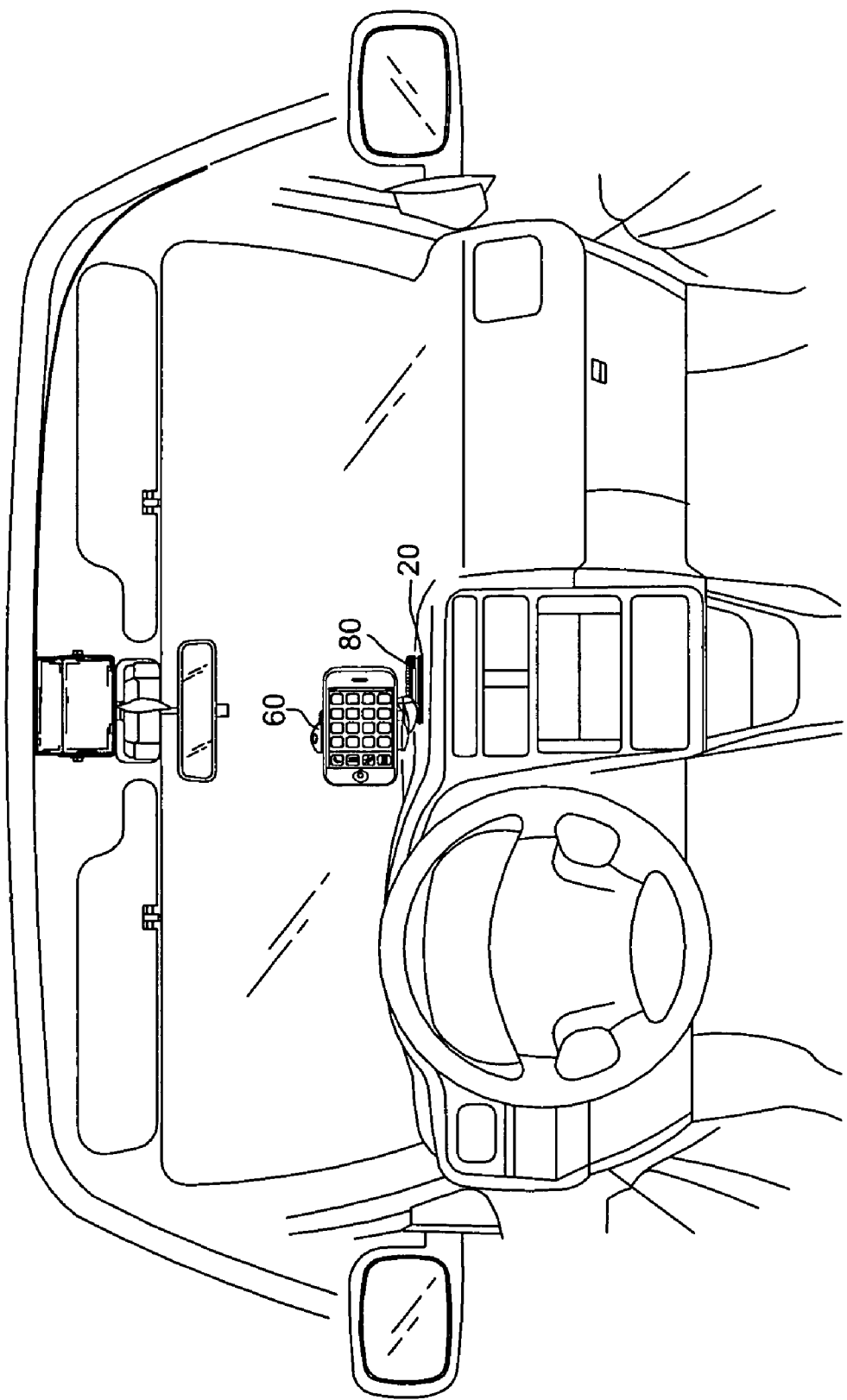
F I G.17

SUCKER ATTACHMENT DEVICE HAVING DIRECTION ADJUSTABLE FUNCTION

BACKGROUND OF THE INVENTION

1. Field of the Invention

The present invention relates to an attachment device and, more particularly, to a sucker attachment device.

2. Description of the Related Art

A conventional sucker attachment device comprises a support base and a sucker connected with the support base. The support base has a holder to hold an article, such as an electronic appliance and the like. When in use, the sucker is bonded onto an object, such as the surface of a wall, the instrument panel of a car and the like, by a vacuum suction between the sucker and the object to attach the support base to the object. However, the angle between the support base and the sucker cannot be adjusted easily and conveniently so that the position of the holder of the support base is fixed and cannot be adjusted.

BRIEF SUMMARY OF THE INVENTION

In accordance with the present invention, there is provided a sucker attachment device, comprising a support base, a pivot seat pivotally mounted on the support base, a sucker mounted on the pivot seat to move in concert with the pivot seat, and a rotation disk swivelably mounted on the support base. The sucker attachment device further comprises a receptacle assembly mounted on the rotation disk. The pivot seat has an outer wall provided with a spherical universal connector pivotally mounted on the support base. The support base has an end portion formed with a spherical pivot recess, and the universal connector of the pivot seat is rotatably mounted in the pivot recess of the support base.

The primary objective of the present invention is to provide a sucker attachment device having a direction adjustable function.

According to the primary objective of the present invention, when the support base is pivoted relative to the universal connector of the pivot seat, the universal connector of the pivot seat is rotated in the pivot recess of the support base through three hundred and sixty degrees (360°) so that the support base is pivoted relative to the pivot seat freely so as to change the angle and direction between the sucker and the receptacle assembly freely and exactly.

According to another objective of the present invention, a user only needs to move the support base relative to the pivot seat so as to pivot the receptacle assembly relative to the sucker easily and quickly, thereby facilitating the user adjusting the angle and direction of the receptacle assembly relative to the sucker.

According to a further objective of the present invention, the sucker attachment device has a simplified construction so as to decrease the costs of fabrication.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 11 is a front cross-sectional operational view of the sucker attachment device as shown in FIG. 1.

FIG. 12 is a partially side cross-sectional view of the sucker attachment device as shown in FIG. 1.

FIG. 13 is a bottom view of the sucker attachment device as shown in FIG. 12.

FIG. 14 is a schematic operational view of the sucker attachment device as shown in FIG. 12.

FIG. 15 is a schematic operational view of the sucker attachment device as shown in FIG. 13.

FIG. 17 is a perspective view of the sucker attachment device for a car in accordance with the preferred embodiment of the present invention.

DETAILED DESCRIPTION OF THE INVENTION

Figure 1:
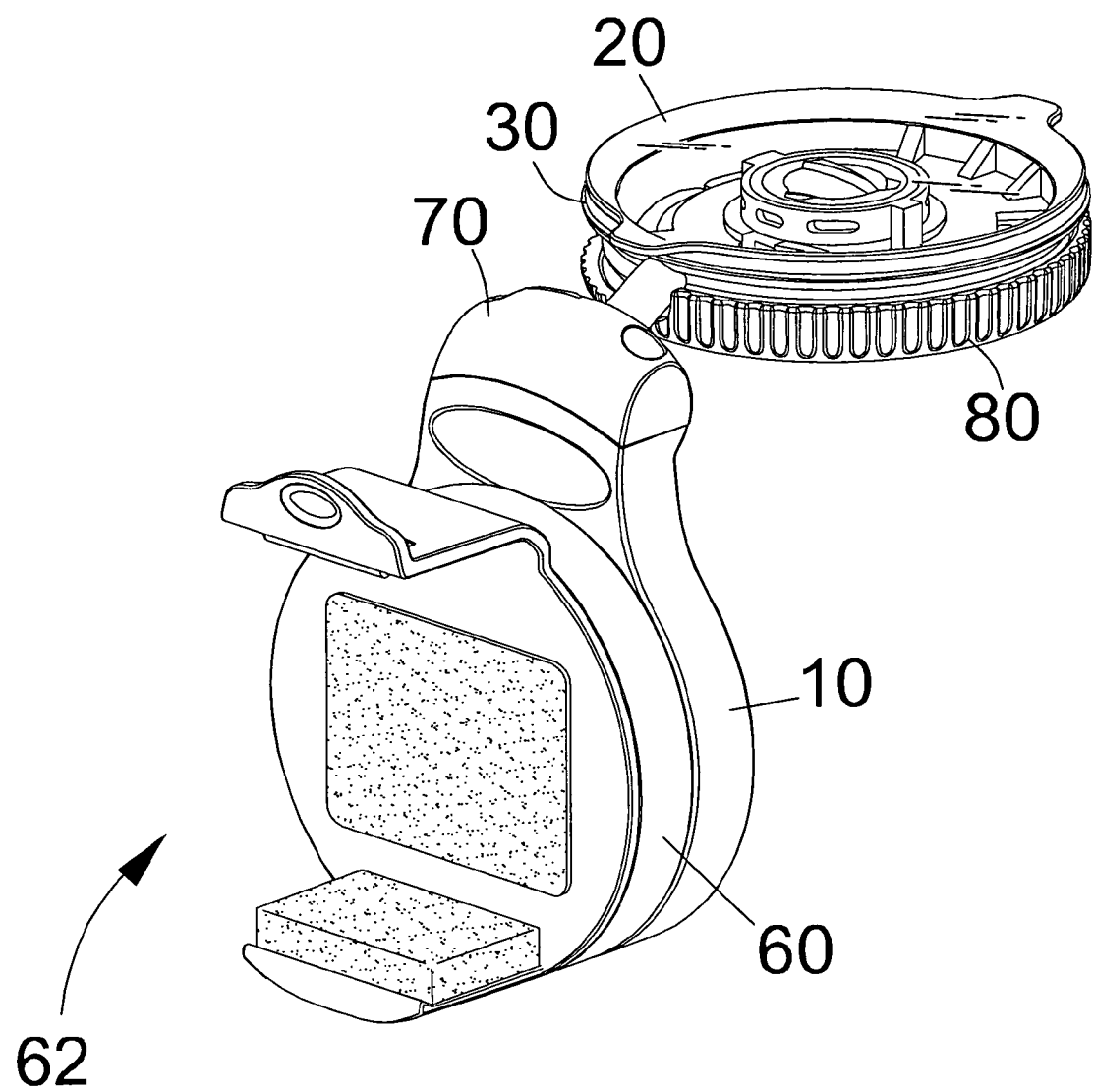
FIG. 1 is a perspective view of a sucker attachment device in accordance with the preferred embodiment of the present invention.
Figure 2:
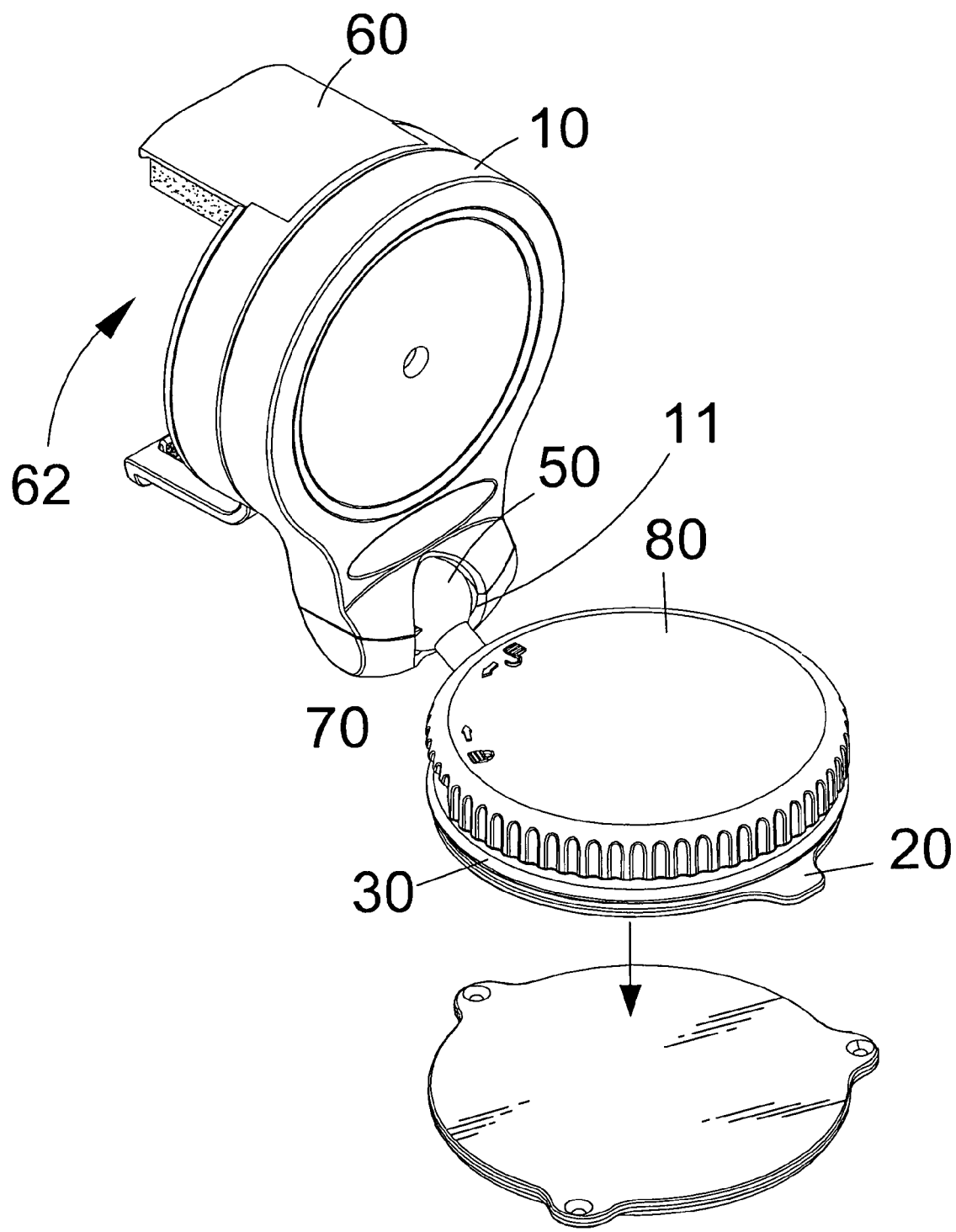
FIG. 2 is a perspective view of the sucker attachment device as shown in FIG. 1.
Figure 3:
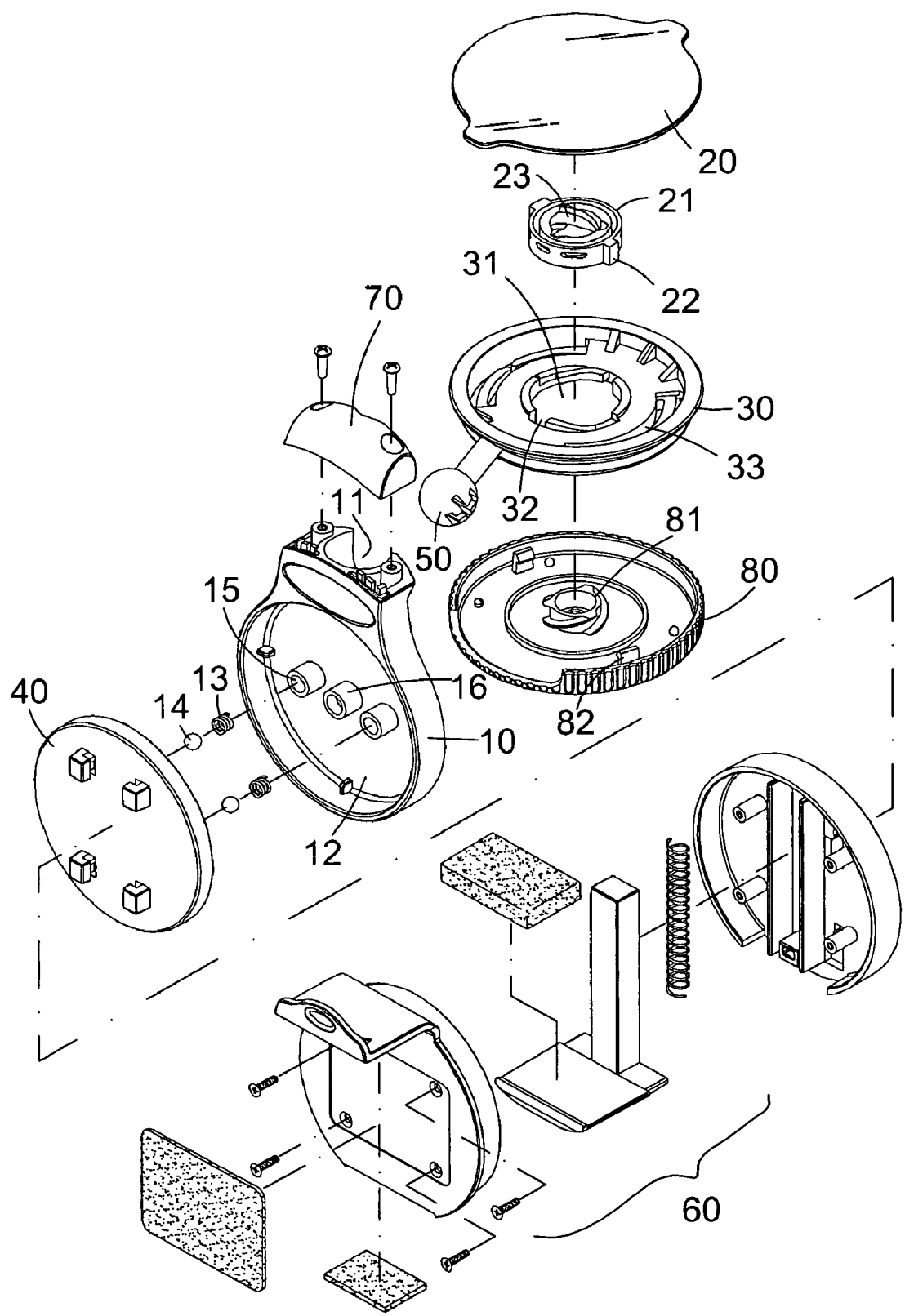
FIG. 3 is an exploded perspective view of the sucker attachment device as shown in FIG. 1.
Figure 3A:
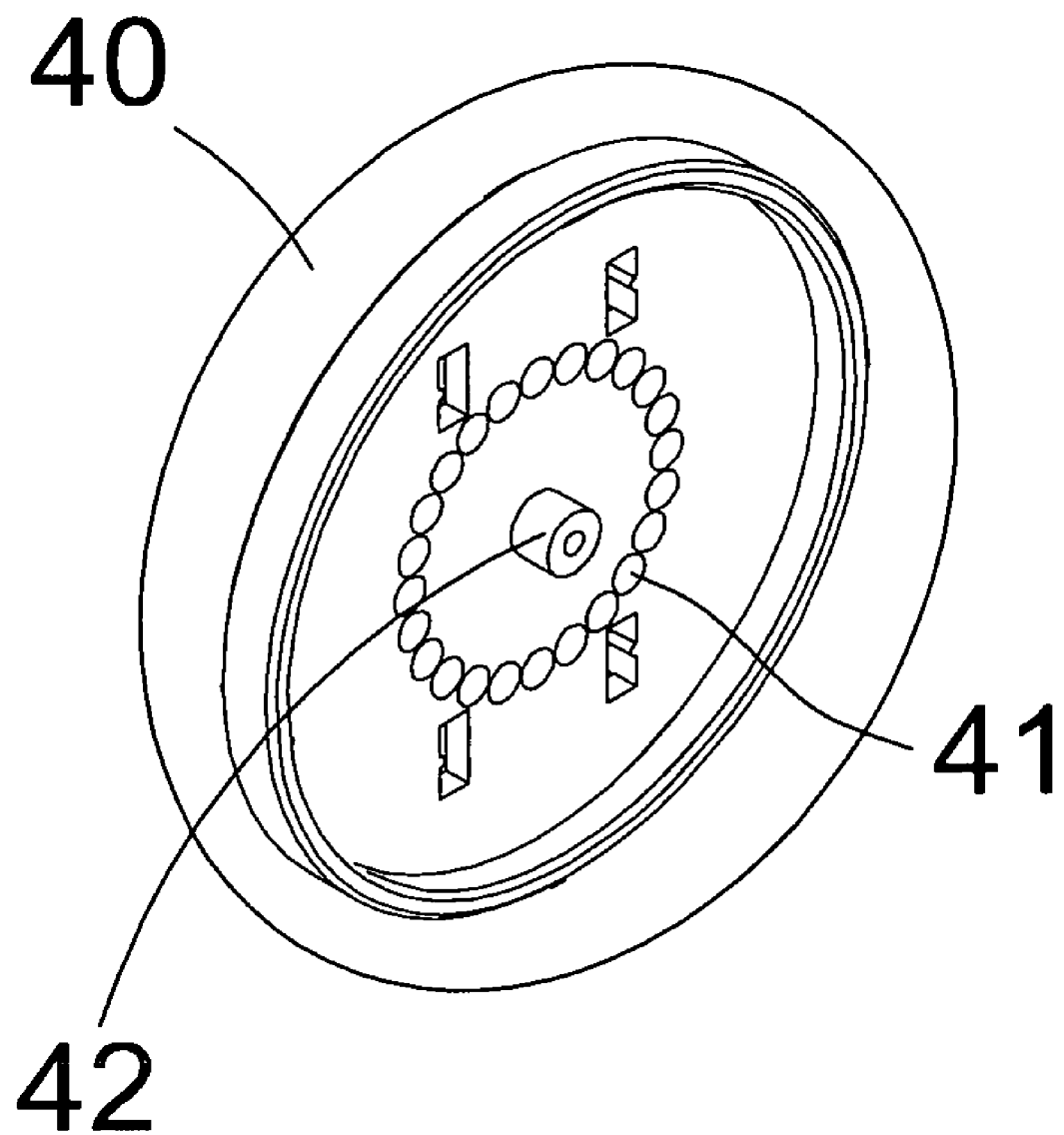
FIG. 3a is a perspective view of a rotation disk of the sucker attachment device as shown in FIG. 3.
Figure 4:
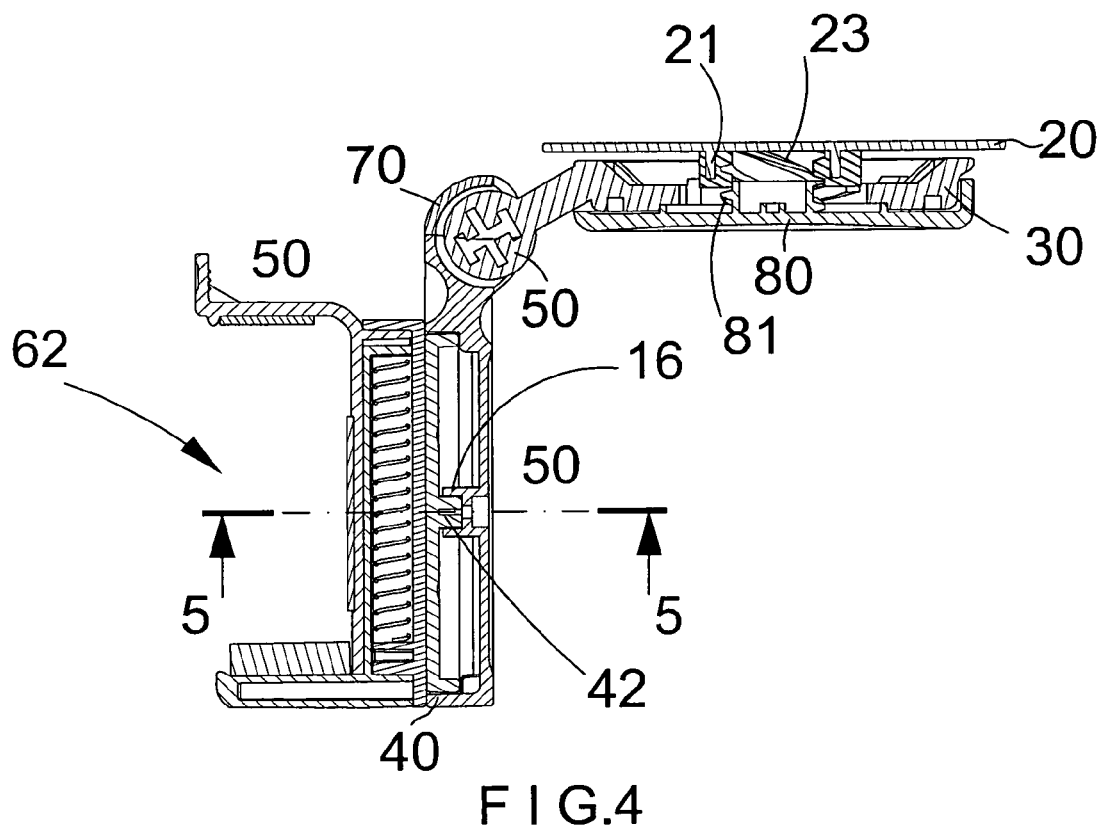
FIG. 4 is a side cross-sectional view of the sucker attachment device as shown in FIG. 1.
Figure 5:
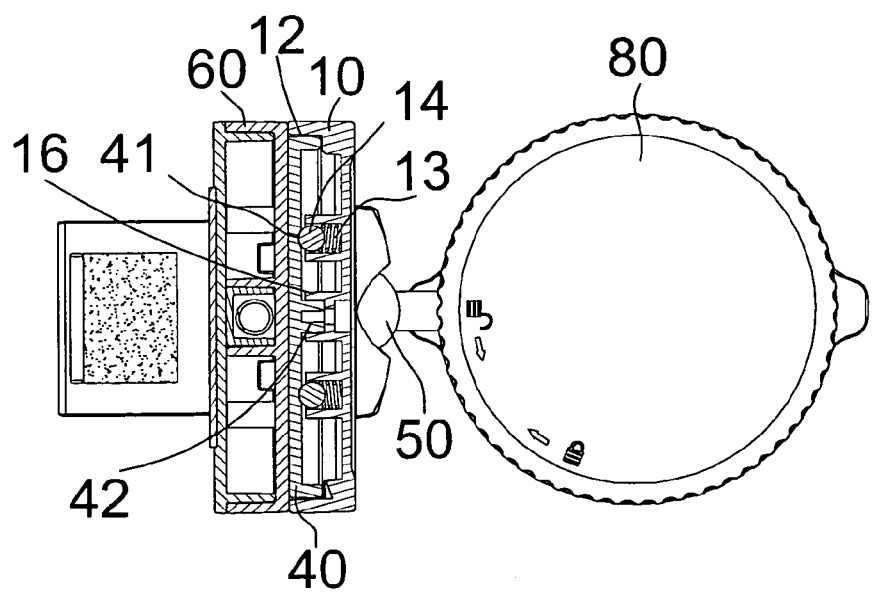
FIG. 5 is a top cross-sectional view of the sucker attachment device taken along line 5-5 as shown in FIG. 4.

Referring to the drawings and initially to FIGS. 1-5, a sucker attachment device in accordance with the preferred embodiment of the present invention comprises a support base 10, a pivot seat 30 pivotally mounted on the support base 10, a sucker 20 mounted on the pivot seat 30 to move in concert with the pivot seat 30, a rotation disk 40 swivelably mounted on the support base 10, a receptacle assembly 60 mounted on the rotation disk 40, and a pressing cap 80 rotatably mounted on the pivot seat 30 and connected with the sucker 20 to press the sucker 20.

The support base 10 has an end portion formed with a spherical pivot recess 11. The support base 10 has an inner portion formed with a mounting chamber 12. The support base 10 has a face provided with two radially opposite sockets 15 each extended into the mounting chamber 12 of the support base 10. The support base 10 has a central portion provided with a mounting sleeve 16 extended into the mounting chamber 12 of the support base 10. The mounting sleeve 16 of the support base 10 is disposed at a center of the sockets 15 of the support base 10.

The rotation disk 40 is swivelably mounted in the mounting chamber 12 of the support base 10. The rotation disk 40 is fully received in the mounting chamber 12 of the support base 10 and has a first face formed with a plurality of positioning grooves 41 which are arranged in an annular shape, and the sucker attachment device further comprises two positioning balls 14 each movably mounted in a respective one of the two sockets 15 of the support base 10 and each detachably positioned in a respective one of the positioning grooves 41 of the rotation disk 40 to position the rotation disk 40 on the support base 10 temporarily, and two elastic members 13 each mounted in a respective one of the two sockets 15 of the support base 10 and each biased between the support base 10 and a respective one of the two positioning balls 14 to push each of the two positioning balls 14 toward the positioning grooves 41 of the rotation disk 40. The first face of the rotation disk 40 has a central portion provided with a threaded rotation tube 42 rotatably mounted in the mounting sleeve 16 of the support base 10. The rotation tube 42 of the rotation disk 40 is disposed at a center of the positioning grooves 41 of the rotation disk 40.

The receptacle assembly 60 is mounted on a second face of the rotation disk 40 and abuts a peripheral wall of the mounting chamber 12 of the support base 10 so that the rotation disk 40 is sandwiched between the support base 10 and the receptacle assembly 60. The receptacle assembly 60 has a substantially U-shaped opening 62 which has an adjustable size. The opening 62 of the receptacle assembly 60 is directed outward relative to the support base 10.

The pivot seat 30 is disposed between the support base 10 and the sucker 20. The pivot seat 30 has an annular shape. The pivot seat 30 has an outer wall provided with a spherical universal connector 50 pivotally mounted on the support base 10. The universal connector 50 of the pivot seat 30 is rotatably mounted in the pivot recess 11 of the support base 10, and the sucker attachment device further comprises a limit plate 70 mounted on the pivot recess 11 of the support base 10 to cover the pivot recess 11 of the support base 10 and abutting the universal connector 50 of the pivot seat 30 to limit the universal connector 50 of the pivot seat 30 in the pivot recess 11 of the support base 10. The pivot seat 30 has an inner wall formed with an axial hole 31. The axial hole 31 of the pivot seat 30 has a peripheral wall formed with two radially opposite retaining grooves 32. The pivot seat 30 has a peripheral wall formed with two radially opposite arcuate elongate guide slots 33.

The sucker 20 is mounted on a first face of the pivot seat 30. The sucker 20 has a face provided with a mounting block 21 which is extended through the axial hole 31 of the pivot seat 30. The mounting block 21 has a ring shape and has an inner wall formed with an inner threaded portion 23. The mounting block 21 has an outer wall formed with two radially opposite retaining lugs 22 secured in the two retaining grooves 32 of the pivot seat 30 respectively so that the mounting block 21 is limited in the axial hole 31 of the pivot seat 30 and is non-rotatable relative to the pivot seat 30.

The pressing cap 80 is rotatably mounted on a second face of the pivot seat 30 so that the pivot seat 30 is sandwiched between the sucker 20 and the pressing cap 80. The pressing cap 80 has a central portion provided with a threaded tube 81 which is screwed into the inner threaded portion 23 of the mounting block 21. Thus, when the pressing cap 80 is rotatable relative to the pivot seat 30, the threaded tube 81 is rotatable relative to the mounting block 21 and is movable in the inner threaded portion 23 of the mounting block 21 to press the sucker 20. The pressing cap 80 has a peripheral wall formed with two radially opposite arcuate limit pieces 82 slidably mounted in the two guide slots 33 of the pivot seat 30 respectively.

Figure 6:
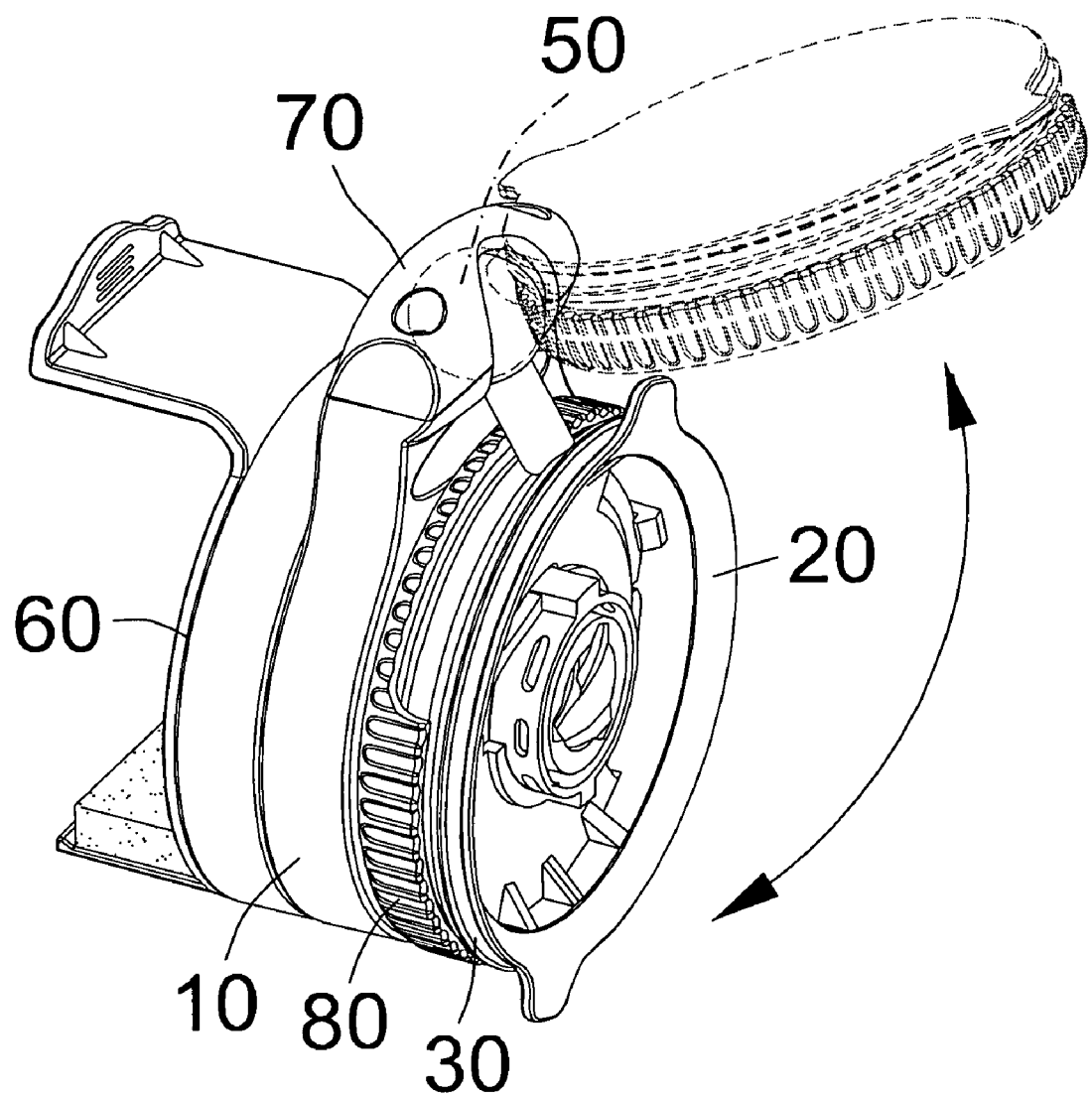
FIG. 6 is a schematic operational view of the sucker attachment device as shown in FIG. 1.

Referring to FIG. 6 with reference to FIGS. 1-5, the universal connector 50 of the pivot seat 30 is rotatable relative to the support base 10 through three hundred and sixty degrees (360°) so as to change the angle and direction between the sucker 20 and the receptacle assembly 60 freely.

Figure 7:
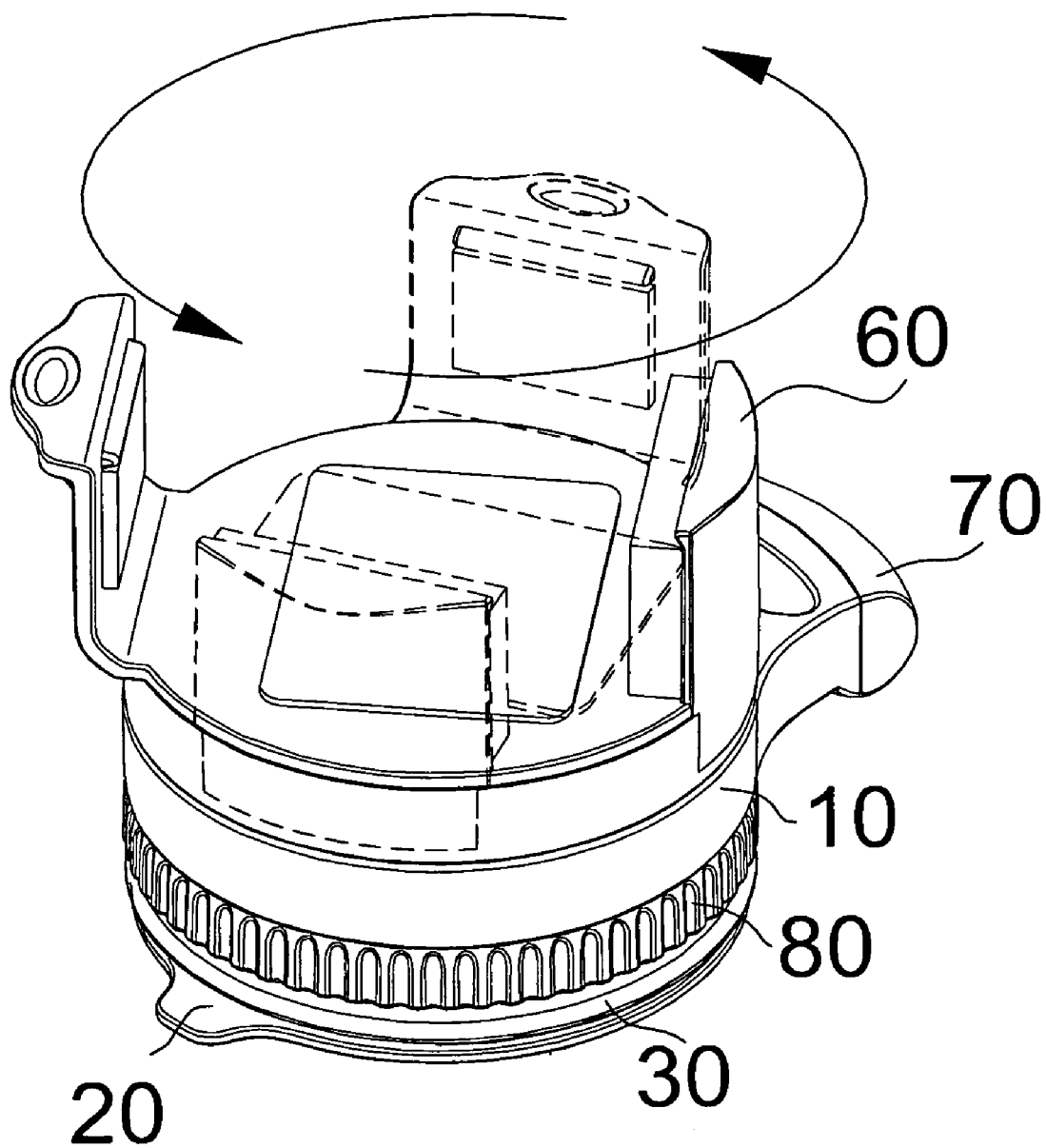
FIG. 7 is a schematic operational view of the sucker attachment device as shown in FIG. 1.
Figure 8:
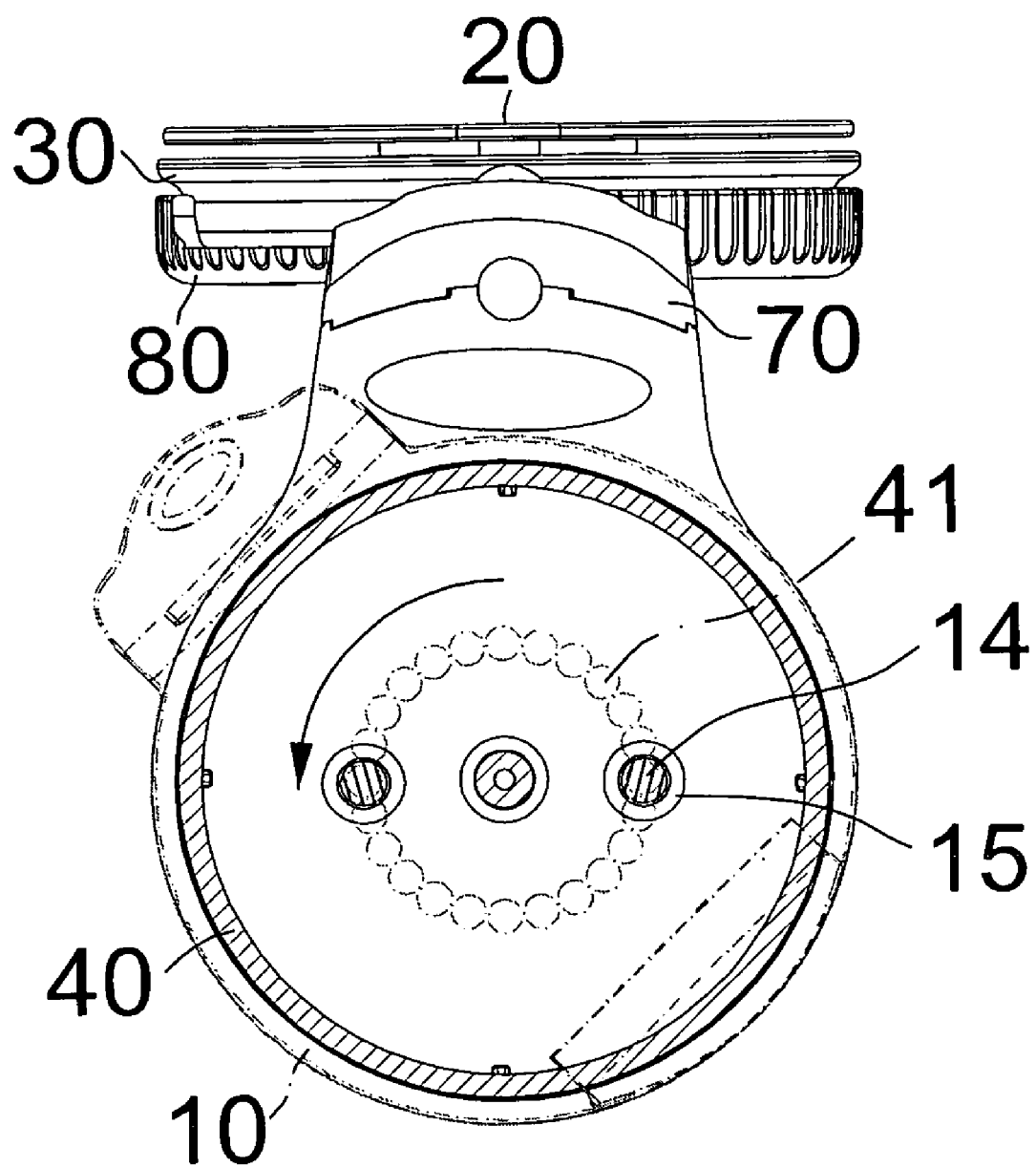
FIG. 8 is a back cross-sectional operational view of the sucker attachment device as shown in FIG. 1.

Referring to FIGS. 7 and 8 with reference to FIGS. 1-5, the rotation disk 40 is swivelably mounted in the mounting chamber 12 of the support base 10 so that the receptacle assembly 60 is rotatable relative to the support base 10 to change the angular position of the receptacle assembly 60. At this time, the positioning balls 14 are positioned in the positioning grooves 41 of the rotation disk 40 respectively so as to position the rotation disk 40 on the support base 10 temporarily.

Figure 10:
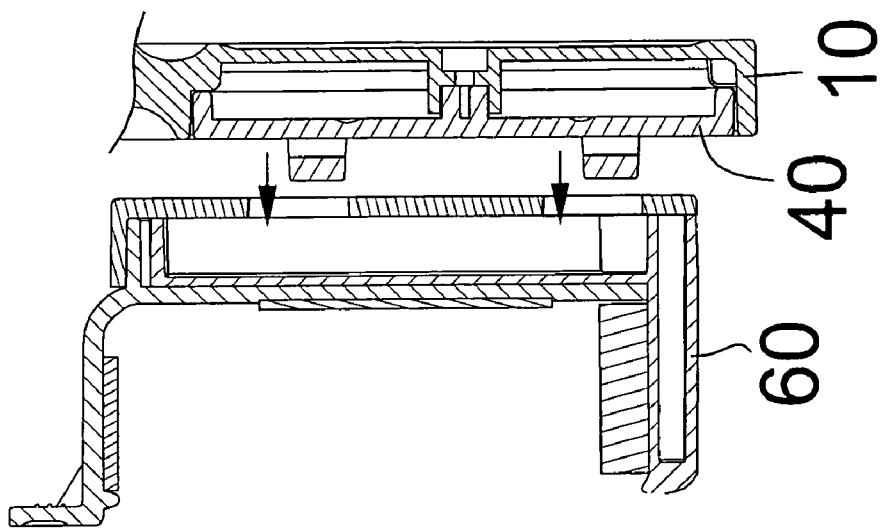
FIG. 10 is an exploded view of the sucker attachment device as shown in FIG. 9.
Figure 9:
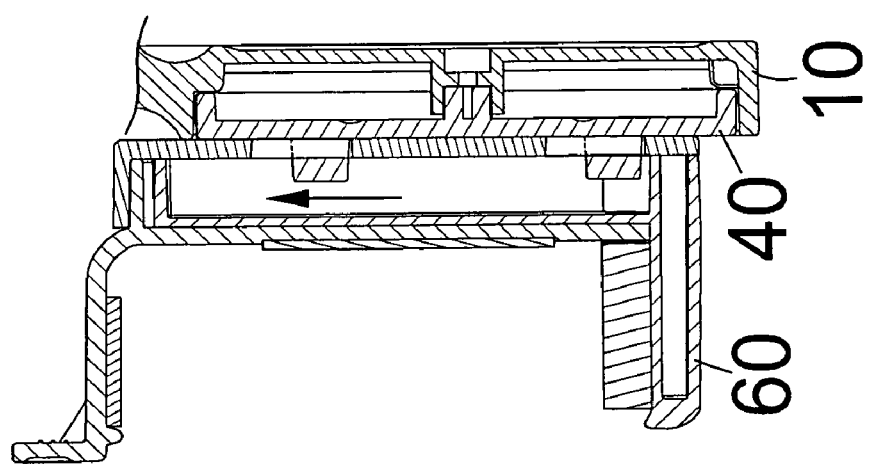
FIG. 9 is a partially side cross-sectional view of the sucker attachment device as shown in FIG. 1.

Referring to FIGS. 9 and 10 with reference to FIGS. 1-5, the receptacle assembly 60 is detachably mounted on the rotation disk 40 so that the receptacle assembly 60 can be detached from the rotation disk 40.

Referring to FIG. 11 with reference to FIGS. 1-5, the opening 62 of the receptacle assembly 60 has an adjustable size.

Referring to FIGS. 12-15 with reference to FIGS. 1-5, when the pressing cap 80 is rotated relative to the pivot seat 30, the threaded tube 81 is rotated relative to the mounting block 21 and is moved in the inner threaded portion 23 of the mounting block 21 to push the sucker 20 toward an object 24 so as to press and attach the sucker 20 onto the object 24 by a vacuum suction force between the sucker 20 and the object 24.

Figure 16:
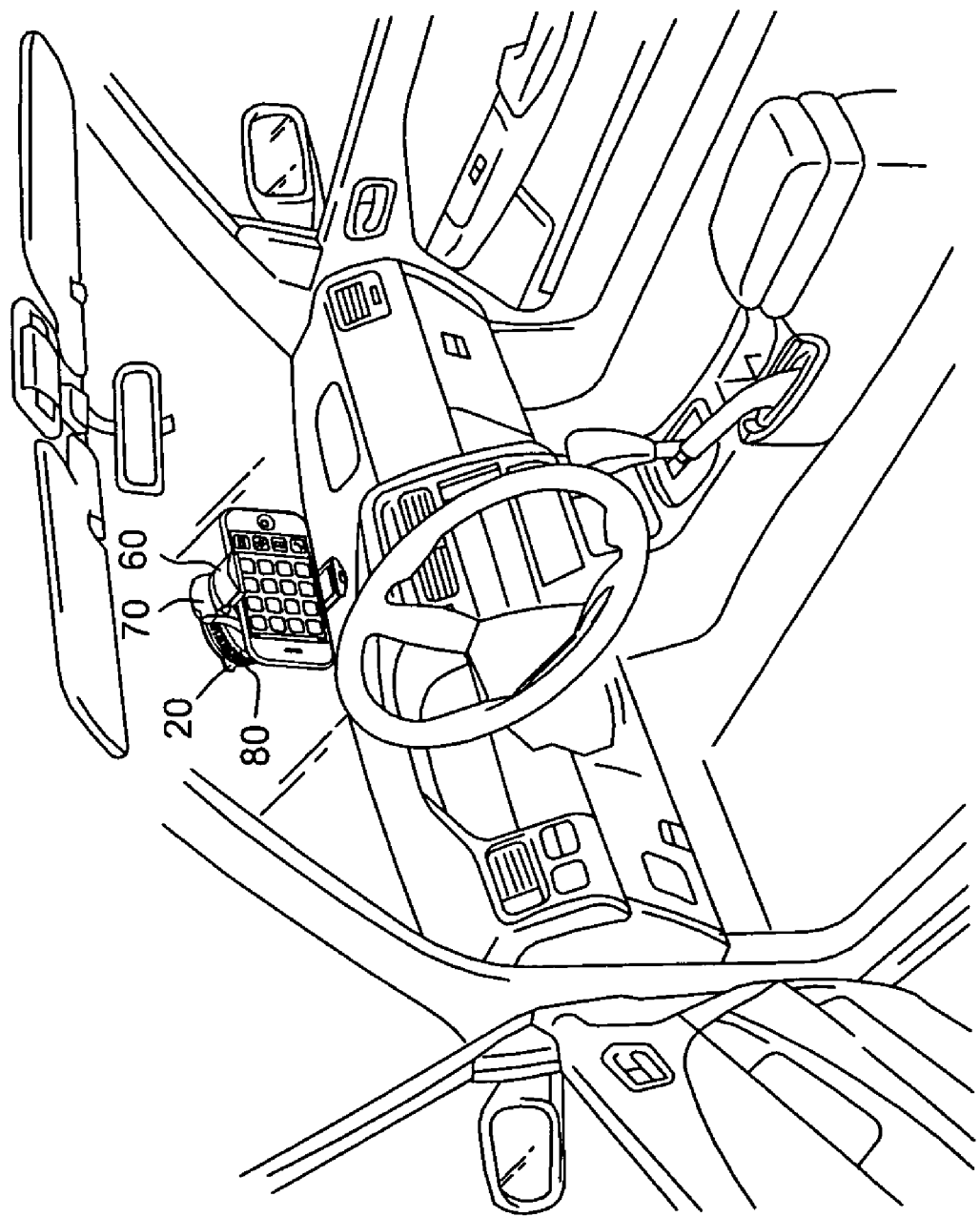
FIG. 16 is a perspective view of the sucker attachment device for a car in accordance with the preferred embodiment of the present invention.

Referring to FIG. 16 with reference to FIGS. 1-5, the sucker 20 is attached to the windshield of a car, and the receptacle assembly 60 is placed on the instrument panel of the car to hold an electronic appliance.

Referring to FIG. 17 with reference to FIGS. 1-5, the sucker 20 is attached to the instrument panel of the car, and the receptacle assembly 60 is placed on the windshield of the car.

Accordingly, when the support base 10 is pivoted relative to the universal connector 50 of the pivot seat 30, the universal connector 50 of the pivot seat 30 is rotated in the pivot recess 11 of the support base 10 through three hundred and sixty degrees (360°) so that the support base 10 is pivoted relative to the pivot seat 30 freely so as to change the angle and direction between the sucker 20 and the receptacle assembly 60 freely and exactly. In addition, a user only needs to move the support base 10 relative to the pivot seat 30 so as to pivot the receptacle assembly 60 relative to the sucker 20 easily and quickly, thereby facilitating the user adjusting the angle and direction of the receptacle assembly 60 relative to the sucker 20. Further, the sucker attachment device has a simplified construction so as to decrease the costs of fabrication.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A sucker attachment device comprising:
   a support base, wherein the support base has an inner portion formed with a mounting chamber, wherein the support base has a face provided with two radially opposite sockets each extended into the mounting chamber of the support base;
   a pivot seat pivotally mounted on the support base;
   a sucker mounted on the pivot seat to move in concert with the pivot seat;
   a rotation disk swivelably mounted on the support base, wherein the rotation disk is swivelably mounted in the mounting chamber of the support base, wherein the rotation disk has a first face formed with a plurality of positioning grooves which are arranged in an annular shape;

a receptacle assembly mounted on the rotation disk;
two positioning balls each movably mounted in a respective one of the two sockets of the support base and each detachably positioned in a respective one of the positioning grooves of the rotation disk to position the rotation disk on the support base temporarily; and
two elastic members each mounted in a respective one of the two sockets of the support base and each biased between the support base and a respective one of the two positioning balls to push each of the two positioning balls toward the positioning grooves of the rotation disk.

2. The sucker attachment device of claim 1, wherein the pivot seat has an outer wall provided with a spherical universal connector pivotally mounted on the support base.

3. The sucker attachment device of claim 2, wherein
the support base has an end portion formed with a spherical pivot recess;
the universal connector of the pivot seat is rotatably mounted in the pivot recess of the support base.

4. The sucker attachment device of claim 3, wherein the sucker attachment device further comprises:
a limit plate mounted on the pivot recess of the support base to cover the pivot recess of the support base and abutting the universal connector of the pivot seat to limit the universal connector of the pivot seat in the pivot recess of the support base.

5. The sucker attachment device of claim 1, wherein the sucker attachment device further comprises:
a pressing cap rotatably mounted on the pivot seat and connected with the sucker to press the sucker.

6. The sucker attachment device of claim 5, wherein
the sucker is mounted on a first face of the pivot seat;
the pressing cap is rotatably mounted on a second face of the pivot seat; and
the pivot seat is sandwiched between the sucker and the pressing cap.

7. The sucker attachment device of claim 1, wherein
the support base has a central portion provided with a mounting sleeve extended into the mounting chamber of the support base;
the mounting sleeve of the support base is disposed at a center of the sockets of the support base;
the first face of the rotation disk has a central portion provided with a rotation tube rotatably mounted in the mounting sleeve of the support base;
the rotation tube of the rotation disk is disposed at a center of the positioning grooves of the rotation disk.

8. The sucker attachment device of claim 1, wherein the receptacle assembly is mounted on a second face of the rotation disk and abuts a peripheral wall of the mounting chamber of the support base; the rotation disk is sandwiched between the support base and the receptacle assembly.

9. The sucker attachment device of claim 1, wherein the pivot seat is disposed between the support base and the sucker.

10. A sucker attachment device comprising:
a support base;
a pivot seat pivotally mounted on the support base, wherein the pivot seat has an inner wall formed with an axial hole, wherein the axial hole of the pivot seat has a peripheral wall formed with two radially opposite retaining grooves;
a sucker mounted on the pivot seat to move in concert with the pivot seat, wherein the sucker has a face provided with a mounting block which is extended through the axial hole of the pivot seat, wherein the mounting block has an inner wall formed with an inner threaded portion, wherein the mounting block has an outer wall formed with two radially opposite retaining lugs secured in the two retaining grooves of the pivot seat respectively, wherein the mounting block is limited in the axial hole of the pivot seat and is non-rotatable relative to the pivot seat, wherein the sucker is mounted on a first face of the pivot seat;
a rotation disk swivelably mounted on the support base; and
a pressing cap rotatably mounted on the pivot seat and connected with the sucker to press the sucker, wherein the pressing cap is rotatably mounted on a second face of the pivot seat, wherein the pivot seat is sandwiched between the sucker and the pressing cap, wherein the pressing cap has a central portion provided with a threaded tube which is screwed into the inner threaded portion of the mounting block.

11. The sucker attachment device of claim 10, wherein the sucker attachment device further comprises:
a receptacle assembly mounted on the rotation disk.

12. The sucker attachment device of claim 11, wherein the receptacle assembly has a substantially U-shaped opening which has an adjustable size.

13. The sucker attachment device of claim 11, wherein
the support base has an inner portion formed with a mounting chamber;
the rotation disk is swivelably mounted in the mounting chamber of the support base.

14. The sucker attachment device of claim 10, wherein
the pivot seat has a peripheral wall formed with two radially opposite arcuate elongate guide slots;
the pressing cap has a peripheral wall formed with two radially opposite arcuate limit pieces slidably mounted in the two guide slots of the pivot seat respectively.

15. The sucker attachment device of claim 10, wherein the mounting block has a ring shape.

16. The sucker attachment device of claim 10, wherein when the pressing cap is rotatable relative to the pivot seat, the threaded tube is rotatable relative to the mounting block and is movable in the inner threaded portion of the mounting block to press the sucker.

17. The sucker attachment device of claim 10, wherein the pivot seat has an annular shape.

18. The sucker attachment device of claim 12, wherein the opening of the receptacle assembly is directed outward relative to the support base.

19. The sucker attachment device of claim 13, wherein the rotation disk is fully received in the mounting chamber of the support base.

* * * * *